Oct. 8, 1968     P. H. SMITH     3,404,620
PREPARATION OF FOOD PRODUCTS
Filed Aug. 22, 1966     5 Sheets-Sheet 1

INVENTOR
Peter Harold Smith
BY Pendleton, Neuman,
Seibold & Williams
ATTORNEY

Oct. 8, 1968  P. H. SMITH  3,404,620
PREPARATION OF FOOD PRODUCTS
Filed Aug. 22, 1966  5 Sheets-Sheet 2

INVENTOR
Peter Harold Smith
BY Pendleton, Neuman,
Seibold & Williams
ATTORNEY

Oct. 8, 1968  P. H. SMITH  3,404,620
PREPARATION OF FOOD PRODUCTS
Filed Aug. 22, 1966  5 Sheets-Sheet 3

INVENTOR
Peter Harold Smith
BY Pendleton, Nauman,
Seibold & Williams
ATTORNEY

Oct. 8, 1968   P. H. SMITH   3,404,620
PREPARATION OF FOOD PRODUCTS
Filed Aug. 22, 1966   5 Sheets-Sheet 4

INVENTOR
Peter Harold Smith
BY Pendleton, Neuman,
Seibold & Williams
ATTORNEY

Oct. 8, 1968    P. H. SMITH    3,404,620
PREPARATION OF FOOD PRODUCTS
Filed Aug. 22, 1966    5 Sheets-Sheet 5

INVENTOR
Peter Harold Smith
BY Pendleton, Neuman,
Seibold & Williams
ATTORNEY

United States Patent Office 3,404,620
Patented Oct. 8, 1968

3,404,620
PREPARATION OF FOOD PRODUCTS
Peter Harold Smith, Maidenhead, England, assignor to Microtherm Limited
Filed Aug. 22, 1966, Ser. No. 574,052
9 Claims. (Cl. 99—357)

ABSTRACT OF THE DISCLOSURE

This disclosure relates to a machine for rapidly heating and vending food products. A plurality of microwave ovens are disposed at spaced locations around the periphery of a rotatable platform. Food products are loaded into ovens at one station, a source of microwave energy is connected to the ovens at a second station to heat the food products, and the food products are removed at a third station. A door closes the access opening of each oven at the second station.

---

This invention relates to dispensing apparatus for dispensing food articles heated ready for consumption. It is very desirable to be able to heat food products rapidly, for example on demand at a point of sale. If products can be heated rapidly, they can be stored at a low temperature which is more hygienic, and much to be preferred to an arrangement in which the products are stored at the temperature for consumption. Storage of food products at an elevated temperature for more than a short time frequently causes deterioration of the product. This is especially the case of food products such as a so-called hot-dog, in which the product includes bread or a bread roll or the like.

The use of microwave energy is very advantageous for this service. Products can be heated from cold storage temperature to a temperature for consumption in a matter of a few seconds, but this rapid heating may not be adequate where sudden large demands for products can be expected, during intervals of play at sports meetings and the like. In simple microwave oven apparatus, the time taken to heat the product is supplemented by the time taken to insert the product into the microwave oven, and to remove it and tender it to the customer. In a practical case, the cycle time for a single oven in such conditions might be about fifteen to twenty seconds.

It is an object of the invention to provide a high output dispensing apparatus that is to say apparatus which enables heated food articles to be dispensed at a high rate.

It is a particular object of the invention to make economical use of the source of heating energy in such apparatus.

It is a related object of the invention to that while economical use is made of the source of heating energy, delays in the throughput of food articles are minimised.

In general terms, the invention relates to a dispensing apparatus including three oven cavities or groups of oven cavities which are mounted for cyclic displacement between three stations, and in operation articles to be heated can be inserted in the cavity or cavities at a first station, while simultaneously articles previously inserted are heated at the second station, and heated articles can be removed by a customer at the third station.

Other features and advantages of the invention will appear from the following description of one embodiment thereof, given by way of example, in conjunction with the accompanying drawings, in which.

A form of the invention shown in FIGURES 1–8 can be adapted for the rapid heating and dispensing of a variety of food products, but is particularly intended for a product such as those described in co-pending applications 329,096 filed Dec. 9, 1963, now Patent No. 3,326,119, 518,578 filed Jan. 4, 1966, and 572,746 filed Aug. 16, 1966. A typical product consists of a bread roll made in two complementary shaped sections, with a filling which can be a frankfurter sausage. The product is symmetrical and uniform throughout its length, and is wrapped in a container of low dielectric loss material, so that the product can be hygienically handled and heated rapidly and uniformly throughout before consumption.

Figure 1:
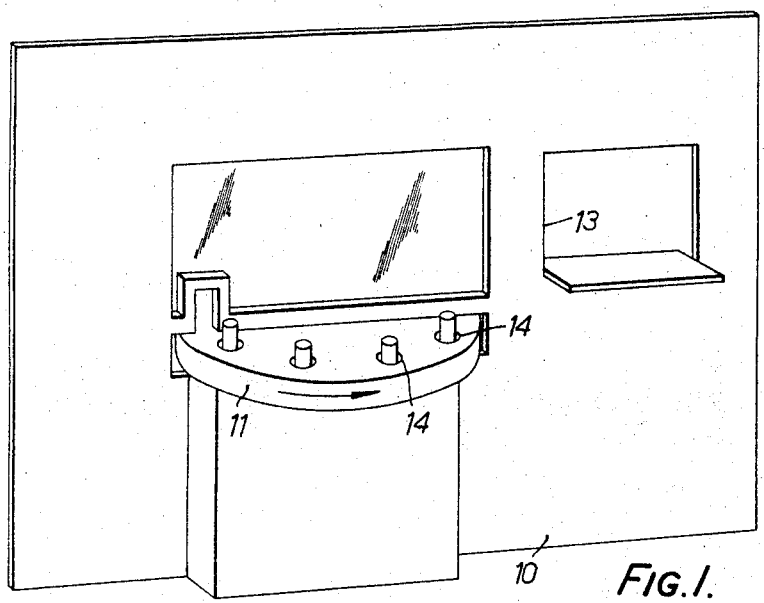
FIGURE 1 is a diagrammatic elevational view of an installation for vending heated products.
Figure 2:
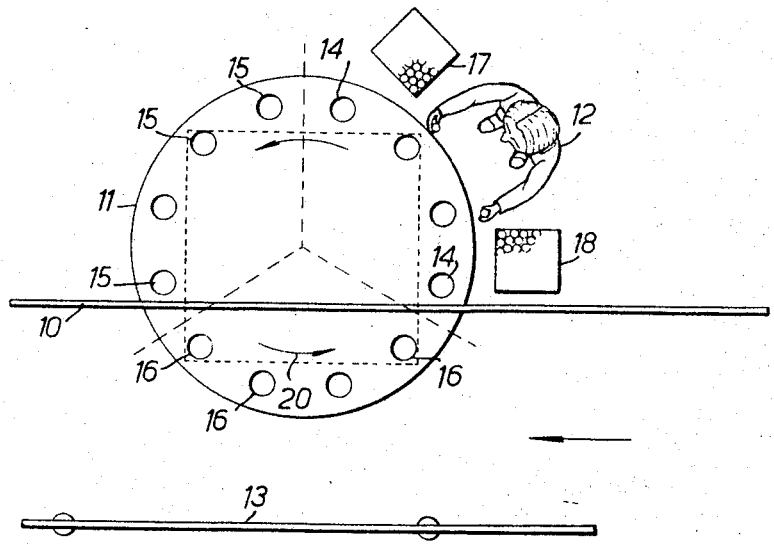
FIGURE 2 is a diagrammatic plan view of the apparatus of FIGURE 1.

FIGURES 1 and 2 indicate the general layout of the machine. The apparatus includes a wall or screen 10, through which partly projects a horizontal rotating table 11. An operator 12 stands adjacent the table on one side of the screen 10 and may receive payment or tokens at a pay window 13. Customers pass in front of the screen 10, behind a barrier 13.

The table carries a series of microwave oven assemblies which are arranged in three groups, at 14, 15 and 16 respectively. Ovens 14 are those which, for the time being, are at the station adjacent the operator 12, and at this station, the operator takes products from suitable supply bins at 17, 18 which if necessary can be maintained at a low temperature, and inserts four products into the four ovens. The table 11 is then indexed through 120 degrees, in the direction of the arrows 20 and the ovens 14 now containing the products appear at the next station, where they are all simultaneously heated by microwave energy fed to the ovens. While the products in the ovens 15 are being heated in this way, the operator 12 is loading the next group of ovens 16, now at the first station. After a time interval which is sufficient for the products in the ovens 14 to be heated, the table is again indexed through 120 degrees, now to bring the ovens 14 to the third station, where the contents of the ovens are made accessible to the customers. In the meantime, the operator is loading the next group 15 of four ovens and those loaded in the ovens 16 are moved to the second station where they in turn are heated.

In this way, efficient use is made of the source of microwave energy for heating the ovens. In the use of the single microwave oven for heating the product, such as that described, and using a power source of about 2 kw., the heating time required is approximately ten seconds. The time taken to load and unload the oven, and for the microwave generator to be switched through its cycle of operation, is also about ten seconds so that with a single microwave source the product rate is approximately one every twenty seconds. With the arrangement described, four products can be made available in approximately ten seconds, so that the use of four times as many power sources results in an increase of output of about eight times. Since the microwave energy sources represent a substantial proportion of the main cost of the apparatus, this is an important saving. It will be appreciated that the figures given are illustrative only and that other figures may apply in other circumstances.

The ovens employed can be of the kind which are described in co-pending and unpublished application Ser. No. 404,770 filed Oct. 19, 1964, now Patent No. 3,289,570 to which attention is directed for a more complete description of the suitable apparatus; however, for the purpose of the present specification it is relevant to mention that the oven described has a cylindrical cavity, to receive the product in its cylindrical package, and the product is inserted downwardly into the oven cavity to depress a plunger against spring bias. When the product has been inserted a latch holds the plunger down, the oven door may be closed, and the heating cycle is then initiated. After a time cycle the door and latch are automatically released, and the spring bias raises the product to make it accessible. During heating the product is rotated in order to secure a substantially uniform heating effect throughout the product.

Figure 3:
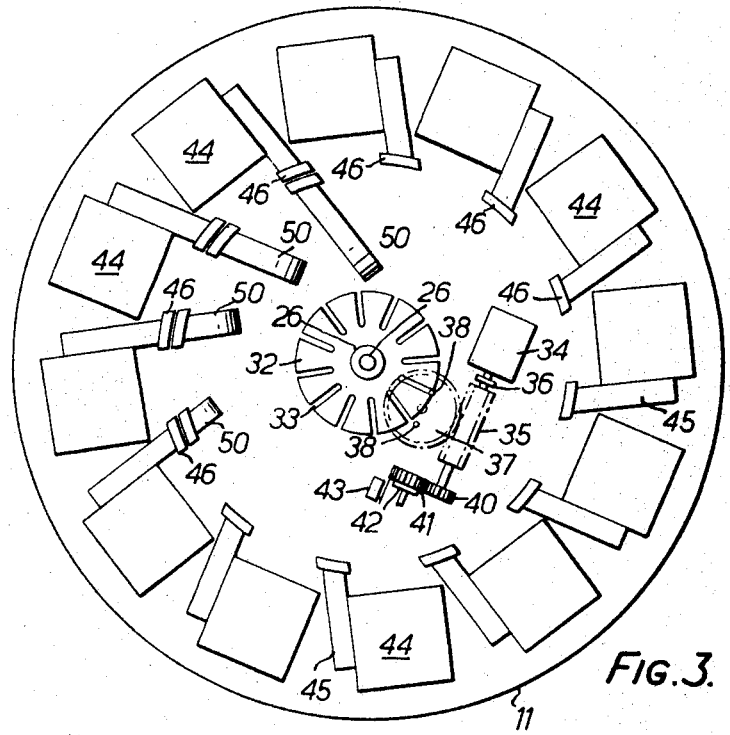
FIGURE 3 is a diagrammatic plan view of the driving mechanism associated with the table of the apparatus of FIGURES 1 and 2.
Figure 4:
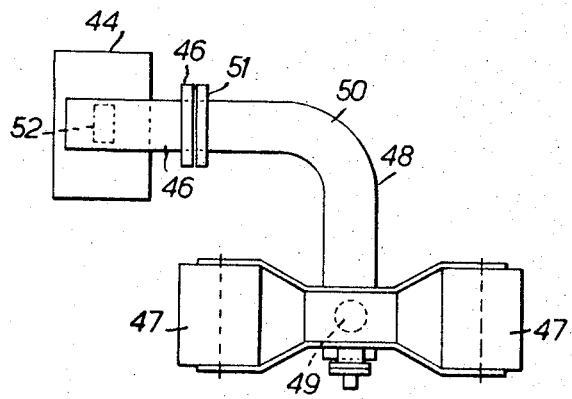
FIGURE 4 is a diagrammatic elevational view showing the coupling between the microwave generator and an oven cavity.
Figure 5:
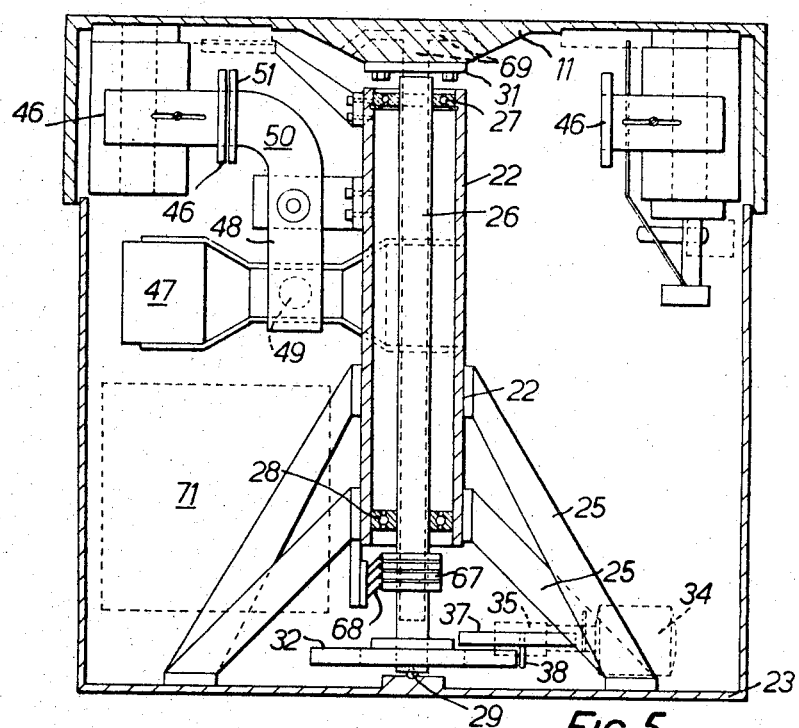
FIGURE 5 is a diagrammatic elevational, part-sectional, view of the driving mechanism for the table of the apparatus of FIGURES 1 and 2.

The general construction of the machine is indicated in FIGURES 3 and 5. A main central support tube 22 is carried from a base 23 by means of a series of spaced inclined arms 24 and 25. Within the tube 22 is a shaft 26 mounted in bearings 27 at the other end of tube 22 and 28 at the lower end. The shaft is carried on a thrust bearing 29 from base 23. Table 11 is carried at the top end of shaft 26 by means of a flange fastening 31, and shaft 26 can be rotated by means of a drive mechanism including a disc 32 fastened to the shaft, and having in it a series of radial slots 33 at twelve equally spaced intervals. An electric motor 34 drives a worm pinion 35 through a non-stall clutch 36; pinion 35 engages a worm wheel 37 having driving pins 38 which co-operates with slots 33 in the disc 32, and thereby index the table in the manner of a Geneva mechanism. Two revolutions of wheel 37 are required to index the table through the four positions, and this is procured by means of the gear 40 on the shaft of one pinion 35, meshing with a further gear 41 which carries a cam 42, actuating a microswitch 43. Cam 42 is arranged to de-energise the motor after 34 has moved through a distance corresponding to two revolutions of wheel 37. The motor 34 may be reenergised after the end of the heating period by manual actuation of a switch by the operator. Suitable timing circuits will occur to those skilled in the art.

In FIGURE 3, the ovens are indicated as having oven structures 44, of which there are twelve equally spaced around the table. Each oven has a wave-guide 45 terminating in a flange connection 46. Four microwave generators, indicated diagrammatically as magnetrons 47 are supported from tube 22, each magnetron coupling into an output wave-guide 48 through a co-axial to wave-guide transition 49 wave-guide 48 includes an E-bend 50 to a terminating flange 51. The flanges 46 on the end of oven wave-guide 45 are all arranged at the same radial distance from the centre of shaft 26, and the flanges 51 of the oven feed wave-guides also terminate at the same radial distance, and, as will be seen from FIGURES 4 and 5, closely adjacent flanges 46. When the table is in one of its indexed positions, the adjacent flanges 46 and 51 provide a quarter wave choke system, so that the radiation of energy from the gap between the flanges is minimised. Energy will thereby be fed from wave-guide 48 into wave-guide 46 and through slot 52 into the associated oven cavity. It may be convenient to arrange that the wave-guides 48 occupy decreasing radial extent, as indicated in FIGURE 3, and there may be an accordingly increased vertical extent for the waveguides, so that all the waveguides are the same total effective lengths.

Figure 6:
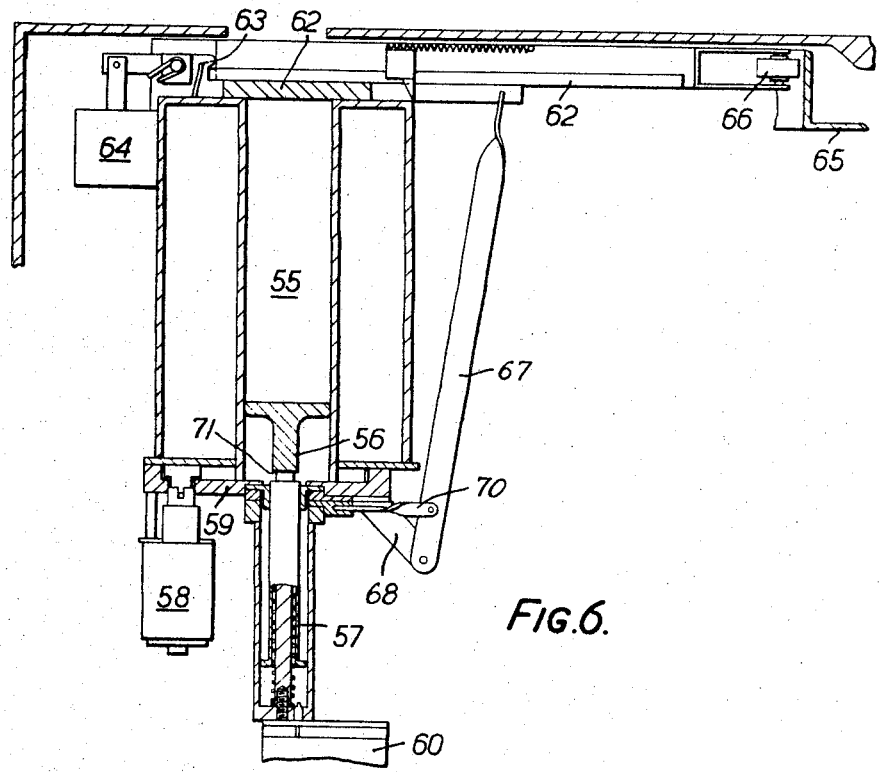
FIGURE 6 is a vertical sectional view through one of the oven cavities, including the product raising mechanism.
Figure 7:
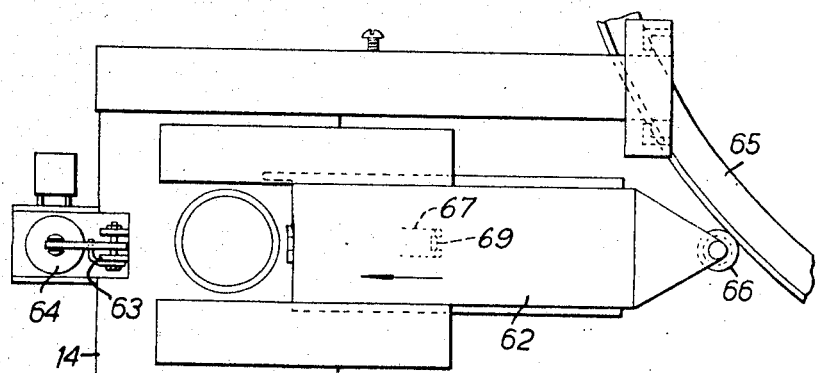
FIGURE 7 is a fragmentary plan view showing the door mechanism for an oven cavity, and the mechanism for moving the door.

The arrangement of the oven structures is indicated diagrammatically in FIGURES 6 and 7; the product when being heated is located in a cavity 55, resting on a vertically movable support plunger 56, biased by spring 57, the cavity 55 being rotated by motor 58 through a suitable drive mechanism 59. A microswitch 60 senses the downward position of the plunger, and hence the presence of a product to be heated in the cavity 55.

Each cavity 55 can be closed by a horizontally moving door 62 which can be retained by a latch 63, releasable by solenoid 64. It is arranged that the doors 62 are closed automatically when the table rotates in the manner described in connection with FIGURE 1, from stations 14 to 15. For this purpose, a cam 65 is provided, and each door 62 is fitted with a cam follower roller 66. This will close the door as the oven cavity moves from the last of positions 14 to the first of positions 15.

A lever 67 is pivoted on a bracket 68 at its lower end, and at its upper end extends into the path of a detent member 69 which is mounted on the door 62, and can pivot clockwise from its position as shown in FIGURE 6. A latch 70 is connected to the lever 67 near its lower end, and can engage in a slot 71 in the plunger 56 to latch the plunger in its downward position. When the door is opened, the detent 69 rotates the lever 67 clockwise (as seen in FIGURE 6), eventually withdrawing the latch 70 from the slot 71. The detent rides over the end of lever 67 as the door nears the end of its travel, and a spring (not shown) returns the lever 67 to the position shown in FIGURE 6. When the door is closed again, the detent 69 pivots and rides over the end of the lever 67.

Since the moving part of the table, with the ovens, contains electrical elements including the product rotation motors 58, microswitches 60 and door release solenoids 64, together with any other protective or supervisory devices which may be incorporated, a commutator system is provided between the shaft 26 and the tube 28, consisting of a series of slip rings 67 and co-operating brushes 68. Connections from the slip rings 67 can pass upwardly through the centre of shaft 26, and through radial passages 69 in the table 11. Power units 71 for supplying electrical power to the magnetrons 47 can be disposed conveniently about the tube 22, and cooling fluid can also be fed to the magnetron units.

Figure 8:
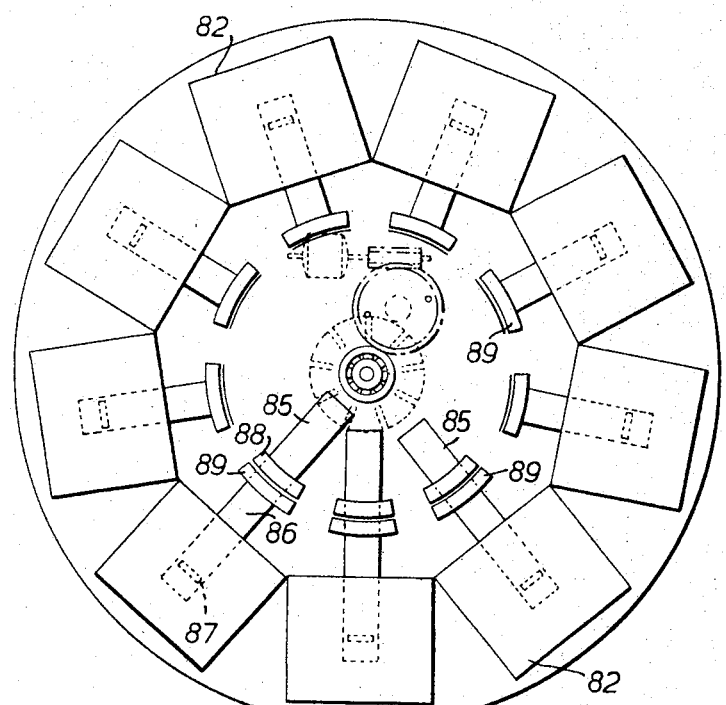
FIGURE 8 is a plan view of the table mechanism of an alternative arrangement, for a different shaped product.
Figure 9:
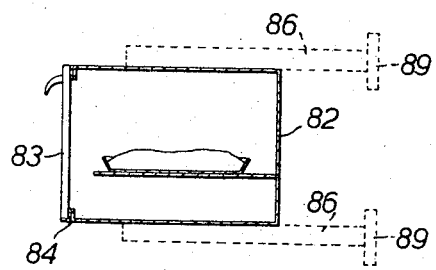
FIGURE 9 is a fragmentary sectional view of an oven cavity of the mechanism of FIGURE 8

An alternative form of construction is shown in FIGURES 8 and 9. The apparatus shown in these figures is intended to heat a rather larger product than that previously described, and is shown diagrammatically at 80. A rotatable table 81 is used as before, and the ovens 82 are disposed round the table, though in this case nine only are employed, in three groups of three. Access to the ovens is given by a door 83 at the front, hinged along its lower edge 84. Three magnetrons, not shown, with their wave-guide feed tubes 85 are used, coupling to the wave-guide inputs 66 for each oven, fed through slots 87. The apparatus below the table 81 generally resembles that described in connection with FIGURES 1 to 7 above.

Figure 10:
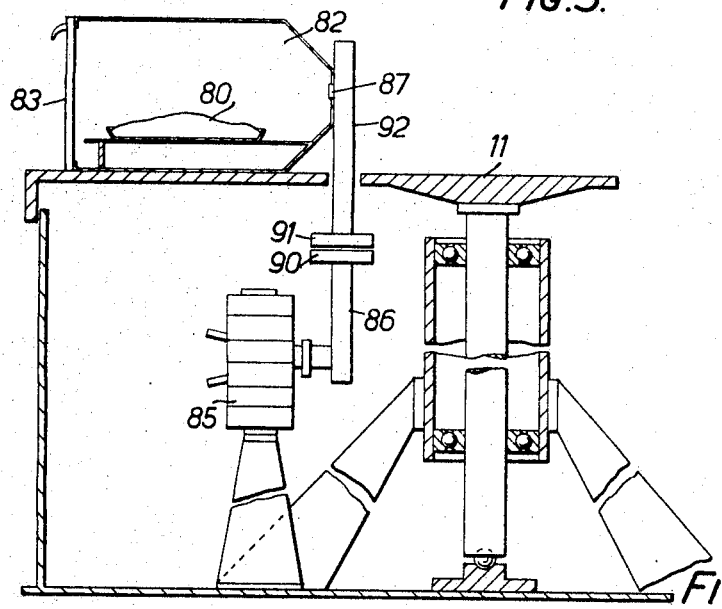
FIGURE 10 is a fragmentary vertical sectional view through the table of FIGURE 8, showing more particularly the oven feed arrangement.

A slightly modified form of the arrangement of FIGURES 8 and 9 are shown in FIGURE 10. In FIGURES 8 and 9, the flanges 88 and 89 are arcuately disposed, whereas in FIGURE 10 they are separated in the horiozntal plane, at 90 and 91, the wave-guide 92 for each oven 82 passing through the table 1 as indicated.

It will thus be seen that the invention provides an apapratus by which it is possible to heat numbers of products rapidly, making most use of the microwave energy sources incorporated in the apapratus.

Other modifications of the apparatus will occur to those skilled in the art. For instance, fewer than nine oven cavities may be mounted on the turntable; the invention is of use even where only three oven cavities are mounted on the turntable. The turntable need not be rotated by a motor as in the preferred embodiments, but may be rotated manually.

What I claim is:

1. Dispensing apparatus for dispensing heated articles of food, comprising support means, at least three oven cavity structures each defining a cavity for receiving an article to be heated, said cavity structures being carried by said support means, and said support means being movable to displace said cavity structures cylically between first, second and third stations, a source of heating energy, connecting means for connecting said source to said cavity structures whereby to heat the articles in the cavity sturctures when the cavity structures are at said second station, and door means for closing said cavity structures when at said second station to contain the heating energy and for permitting access to said cavities when at said first and third stations, whereby simultaneously an article to be heated can be inserted in a cavity at said first station, an article can be heated in a cavity at said second station, and a heated article can be removed by a customer at said third station.

2. Dispensing apparatus according to claim 1 wherein said support means is adapted for rotation about a central vertical axis, said cavity structures being spaced at substantially equal distances about said axis.

3. Dispensing apparatus according to claim 1 wherein said door means comprises a door member for each of said cavity structures, the door members being carried by said support means.

4. Dispensing apparatus according to claim 3 and comprising door closing means for moving said door members to closed positions in which they close the associated cavities, after an article to be heated has been inserted but before heating energy is supplied to the associated cavities, and latch means for retaining the door members in said closed positions.

5. Dispensing apparatus according to claim 4 wherein said door closing means comprises a cam member, and a cam follower member connected to each of said door members, said cam member being positioned so that the door members are moved to said closed positions by engagement of the associated cam follower members with said cam member on displacement of the associated cavity structures from said first station to said second station.

6. Dispensing apparatus according to claim 4 and comprising door opening means for releasing said latch means and moving said door members to open positions to permit access to said cavities when at said third and first stations.

7. Dispensing apparatus according to claim 6 adapted for heating generally cylindrical articles wherein each of said cavities is of elongate generally cylindrical form, and including ejection means for partially ejecting a heated article from said cavities when said door means is opened.

8. Dispensing apparatus according to claim 1 wherein said source includes means for generally radio frequency electromagnetic energy, and said connecting means includes first wave-guide means extending from said source, and second wave-guide means extending from each of said oven cavities and carried by said support means, said first and second wave-guide means terminating respectively in first and second coupling means, and said first coupling means being disposed to co-operate with said second coupling means when the associated cavity structures are at said second station whereby to connect the associated cavities to said source.

9. Dispensing apparatus according to claim 8, comprising at least six of said cavity structures, wherein said source comprises a plurality of the electromagnetic generating means, and said first wave-guide means comprises a wave-guide element extending from each of the electromagnetic generating means and terminating in an individual coupling means, whereby to connect the electromagnetic generating means simultaneously to respective ones of said cavities when at said second station.

References Cited

UNITED STATES PATENTS

| 1,771,762 | 7/1930 | Allwine | 99—427 |
| 2,591,072 | 4/1952 | Hughes | 99—427 XR |

FOREIGN PATENTS

| 958,392 | 5/1964 | Great Britain. |

BILLY J. WILHITE, *Primary Examiner.*